UNITED STATES PATENT OFFICE.

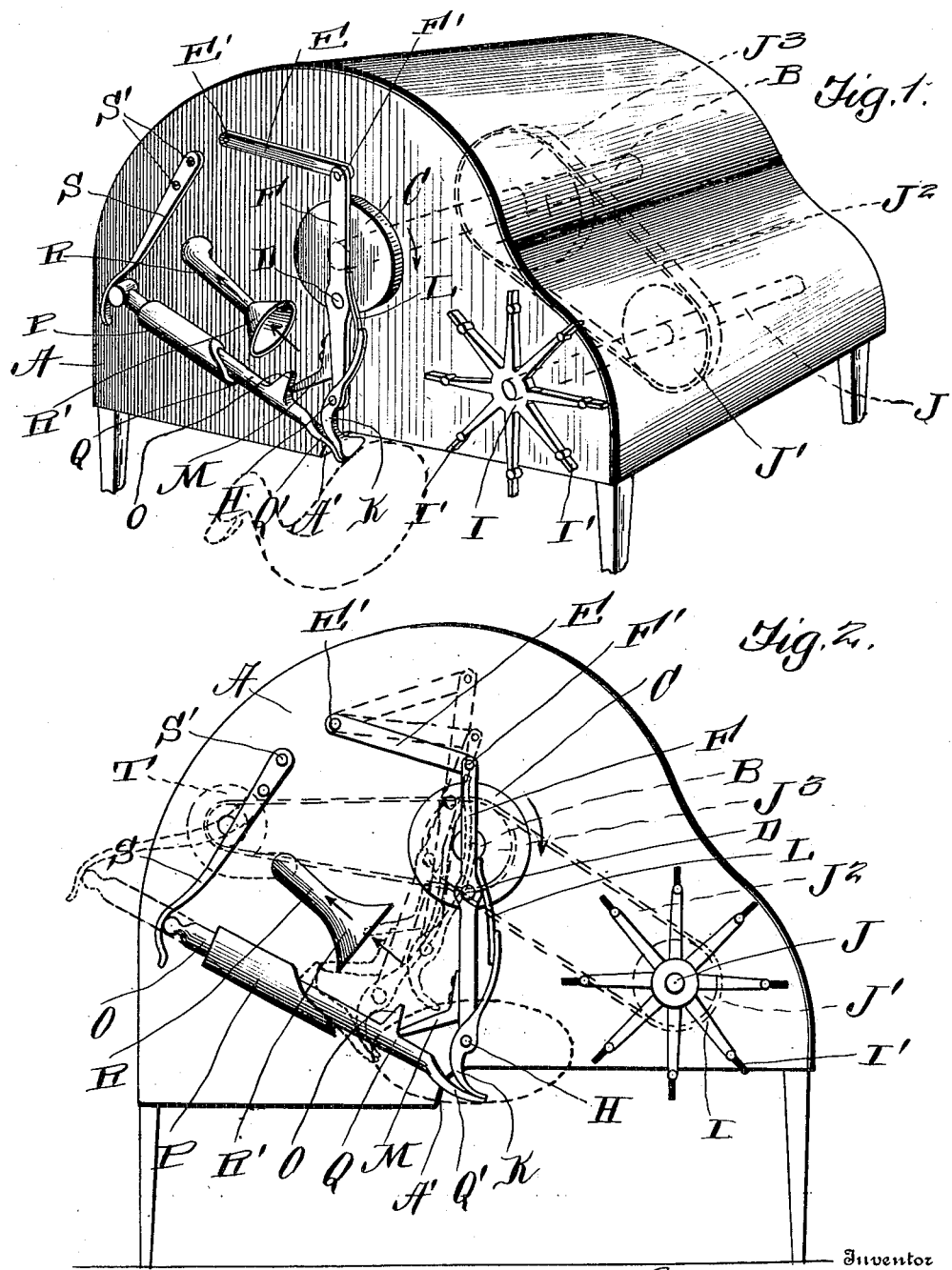

SAMUEL E. MORRISON, OF OXFORD, PENNSYLVANIA, ASSIGNOR OF THREE-EIGHTHS TO JOHN W. WOODSIDE, OF PHILADELPHIA, PENNSYLVANIA, AND THREE-EIGHTHS TO DAVID B. WOODSIDE, OF OXFORD, PENNSYLVANIA.

MACHINE FOR PLUCKING FEATHERS.

No. 837,330.

Specification of Letters Patent.

Patented Dec. 4, 1906.

Application filed August 11, 1905. Serial No. 273,795.

*To all whom it may concern:*

Be it known that I, SAMUEL E. MORRISON, a citizen of the United States, residing at Oxford, in the county of Chester and State of Pennsylvania, have invented certain new and useful Improvements in Machines for Plucking Feathers; and I do declare the following to be a full, clear, and exact description of the invention, such as will enable others skilled in the art to which it appertains to make and use the same, reference being had to the accompanying drawings, and to the letters of reference marked thereon, which form a part of this specification.

This invention relates to new and useful improvements in apparatus for plucking feathers from a fowl, and comprises a simple and efficient mechanism whereby the feathers may be quickly removed from a duck or other bird, and comprises clamping-jaws, one of which is adapted to have an elliptical movement and the other a reciprocating movement, the two jaws coöperating to grasp the feathers and frictionally hold the same while being loosened from the skin of the bird, after which the feathers may be withdrawn by pneumatic or other means and conveyed to any suitable location.

The invention comprises various details of construction and combinations and arrangements of parts, which will be hereinafter fully described, and then specifically defined in the appended claims.

My invention is illustrated in the accompanying drawings, in which—

Figure 1 is a perspective view of my improved apparatus for plucking feathers, and Fig. 2 is a side elevation of the apparatus.

Reference now being had to the details of the drawings by letter, A designates a casing, which may be of any shape or size and has mounted therein an operating-shaft B, journaled in the ends of the casing, and to said shaft is fixed a disk C, having an eccentrically-mounted pin D thereon, said disk being mounted, preferably, on the outside of the casing. E designates a link, which has pivotal connection with a pin E', carried by the end of the casing, and F is a lever pivoted at F' to the link E and also having pivotal connection with said eccentrically-mounted pin D. The lever F is connected to the disk at any suitable location intermediate its ends, preferably near its middle, and its lower end carries a pivotal pin H, upon which the curved shank portion of the jaw K is mounted. A spring L is fixed to said lever F and bears yieldingly against the upper free end of the lever K and is provided to hold the latter normally in the position shown in Fig. 1 of the drawings. Upon one edge of the lever F is fastened a bracket-arm M, which at every rotary movement of the disk C is designed to contact with a lug O upon the reciprocating bar Q, which latter has a jaw Q' formed at its lower end. A housing or guideway P is mounted upon the side of the casing and is hollow and adapted to receive said bar Q, which has a longitudinal movement therein. A spring S is fastened, as at S', to the end of the casing and bears yieldingly against the upper end of the bar Q for the purpose of normally holding the same at its farthest downward and forward throw.

R designates a pneumatic passage-way having a funnel-shaped end R', which latter is placed adjacent to the jaws, and said passage-way communicates with the fan-casing T, whereby the feathers as they are plucked and released by the jaws may be drawn through said passage-way and conveyed to any suitable location.

It will be noted that the two jaws when in the act of grasping the feathers to be plucked will be positioned adjacent to an offset A', formed in the lower edge of the casing, and in which offset the bird to be plucked may be held.

Mounted upon a counter-shaft J, journaled in the end walls of the casing, is a pulley J', which has belted connection $J^2$ with a pulley $J^3$ upon the shaft B, and I designates a rotary brush having radial arms, the ends of which are provided with rubber flaps I'. Said brush I is provided for the purpose of removing the down from the bird after the feathers have been plucked by the rotary jaws pressing against the skin.

The operation of my apparatus is as follows: When the shaft B is being driven from any suitable source of power, (not shown,) the jaw K, being mounted as shown and described, will be caused to travel in an elliptical path, as designated by dotted outline in Fig. 2 of the drawings, and in the forward movement of said jaw the lower convex edge thereof will draw the feathers of a bird held adjacent thereto down against the concave jaw Q', and after the feathers have been thus gripped by the two jaws the bracket-arm M upon the lever F coming in contact with the lug O will cause a longitudinal movement to be imparted to the bar Q, and the jaws moving together backward will cause the feathers to be loosened from the skin of the bird, and when the bracket-arm M passes by the lug O the two jaws will separate and the pneumatic current will draw the feathers through the passage-way R and the spring S will return the jaw Q' to its forward normal position and the jaw K will make another elliptical revolution and the operation will be repeated. After the feathers have been plucked the bird may be held in the path of the rubber flaps upon the ends of the arms of the rotary brush and the down may be easily and quickly wiped from the skin.

From the foregoing it will be observed that by the provision of the apparatus shown and described a simple and efficient means is provided for mechanically plucking the feathers from a bird, the mechanism being so constructed that there will be a gradual withdrawing of the feathers from the surface of the skin of the bird, the jaws being so positioned that they cannot grip the skin of the bird, as is the case in apparatus in which two clamping-jaws come down at right angles to the bird and are apt to tear the skin when gripping the feathers.

Having thus fully described my invention, what I claim as new, and desire to secure by Letters Patent, is—

1. An apparatus for plucking feathers, comprising a casing, a shaft mounted therein, a disk fixed to said shaft, a pivotal lever mounted eccentrically upon said disk, a link pivotally mounted at one end of said casing, and its other end pivotally connected to said lever, a jaw pivotally mounted upon said lever, a spring fixed to said lever and bearing yieldingly against said jaw, a spring-pressed reciprocating jaw, and means carried by said lever for imparting a longitudinal movement to said reciprocating jaw, as set forth.

2. An apparatus for plucking feathers, comprising a casing, a shaft mounted therein, a disk fixed to said shaft, a pivotal lever eccentrically mounted upon said disk, a link pivotally mounted at one end of said casing, and its other end pivotally connected to said lever, a jaw pivotally mounted upon said lever, a spring fixed to said lever and bearing yieldingly against said jaw, a bracket-arm projecting from said lever, a spring-pressed reciprocating jaw, a lug projecting from the shank portion thereof and in the path of said bracket-arm, as set forth.

In testimony whereof I hereunto affix my signature in presence of two witnesses.

SAMUEL E. MORRISON.

Witnesses:
HOLLIS G. KELLY,
SAMUEL H. SMITH.